United States Patent Office 3,655,727
Patented Apr. 11, 1972

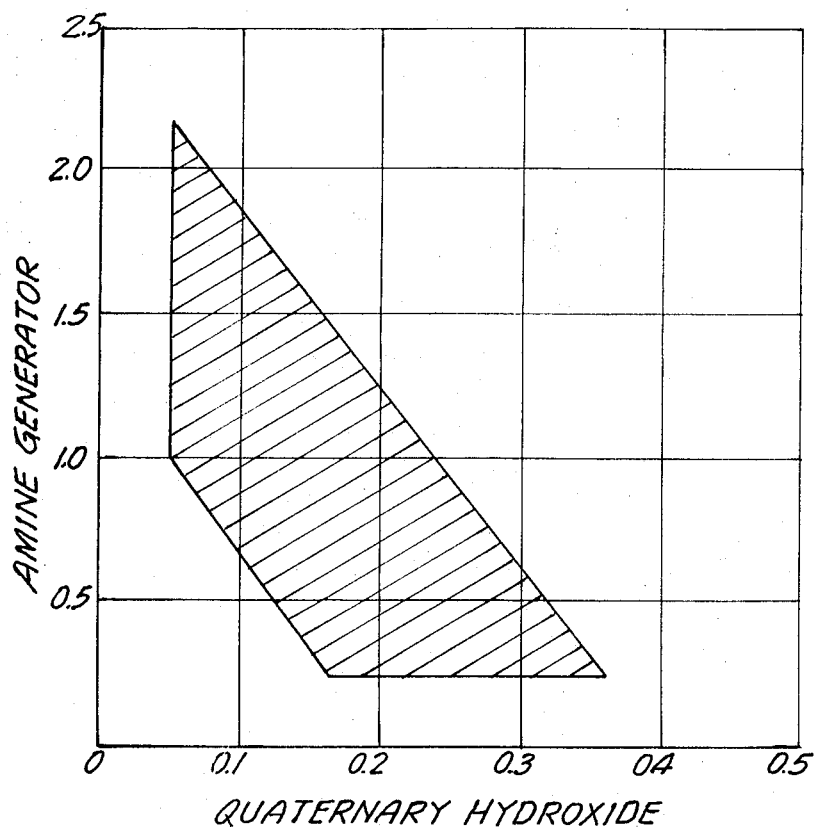

3,655,727
CURING SYSTEMS FOR VINYLIDINE FLUORIDE ELASTOMERS
Kalyanji U. Patel, St. Paul, and John E. Maier, Woodbury, Minn., assignors to Minnesota Mining and Manufacturing Company, St. Paul, Minn.
Continuation-in-part of application Ser. No. 831,295, June 9, 1969, which is a continuation-in-part of application Ser. No. 802,917, Feb. 27, 1969, which in turn is a continuation-in-part of application Ser. No. 753,618, Aug. 19, 1968. This application Jan. 16, 1970, Ser. No. 3,396
Int. Cl. C08f 27/08
U.S. Cl. 260—470 P
19 Claims

ABSTRACT OF THE DISCLOSURE

A curable aromatic copolymer composition comprising vinylidene fluoride copolymer, at least one quaternary phosphonium or ammonium compound, and at least one elastomeric hydroxy or amino compound having an oxidation potential not more than 1.5 volts with respect to a standard calomel electrode and process for the curing thereof in the presence of an inorganic acid acceptor capable of generating water upon reacting with hydrogen fluoride.

---

This application is a continuation-in-part application of U.S. application Ser. No. 831,295, filed June 9, 1969, which is a continuation-in-part of U.S. application Ser. No. 802,917, filed Feb. 27, 1969, which is a continuation-in-part application of U.S. application Ser. No. 753,618, filed Aug. 19, 1968, all now abandoned.

This invention relates to a method for crosslinking fluorinated polymers and crosslinking compositions for use therein. In one aspect this invention relates to a new vulcanization admixture for producing a crosslinked product of improved compression set. In another aspect this invention relates to the modification of the characteristics of linear saturated polymers containing halogen substituents on the carbon atoms, particularly those polymers having elastomeric properties.

In general, linear polymers are thermoplastic in nature and exhibit continuous flow under the influence of heat and pressure. Such polymers can be resoftened as often as desired and are usually soluble in selected solvents. However, crosslinked or vulcanized polymers are generally thermoset, i.e. insoluble in most solvents and incapable of being resoftened without decomposition, since they are permanently hardened. A linear polymer may nevertheless contain a small number of crosslinkages without losing its thermoplastic properties. It is often desirable to convert thermoplastic polymers into crosslinked polymers or into partially crosslinked polymers in order to decrease their solubility and thermoplastic flow properties and to obtain a harder and tougher product. The crosslinking of elastomers is commonly referred to as vulcanization.

Among the most difficultly vulcanizable thermoplastic polymers are those prepared by the polymerization of halogenated monoolefins, such as, for example, the copolymers of chlorotrifluoroethylene and vinylidene fluoride, the copolymers of perfluoropropene and vinylidene fluoride and the terpolymers of perfluoropropene, vinylidene fluoride and tetrafluoroethylene. Many of these fluorinated thermoplastic polymers have unique and valuable properties. In some case, when it is desired to retain these properties and at the same time decrease the thermoplastic flow and solubility, and the polymers are crosslinked. Such crosslinking has heretofore resulted in a relatively high compression set of the final product, e.g. a compression set of more than 30% after 24 hours at 400° F. (205° C.).

One major utility of vulcanized, highly fluorinated elastomers lies in their use as gaskets, O-rings and the like, for containing fluids under pressure at elevated temperatures, as, for example, in hydraulic systems in aircraft, or as components of reactors in the processing of chemicals. In use, the elastomer is continually compressed for extended period of time. If during use the elastomeric part becomes permanently deformed, i.e., undergoes compression set, the seal fails causing leakage. In general, the higher the temperature and the longer the elastomer is under compression, the greater the degree of compression set and accordingly the greater the danger of equipment failure.

It is therefore an object of this invention to provide a new and improved crosslinking system.

Another object of this invention is to provide a new curable, fluorinated polymer admixture.

Still another object of this invention is to provide a method for crosslinking vulcanizable fluorinated elastomers.

A further object of this invention is to provide a cured fluorinated elastomer with improved physical properties, including low compression set.

An important object of this invention is to provide a crosslinking or curing system for fluorinated elastomers which utilizes relatively low concentrations of curing agent but which still is capable of conveniently producing a cured elastomer having low compression set and having a minimal amount of residual, unreacted curing agent, thereby reducing the undesirable tendency of the cured elastomer to further cure during actual use, aging or testing.

Other objects and advantages of the present invention will become apparent to those skilled in the art from the accompanying description and disclosure.

Accordingly the invention provides an elastomeric composition curable in reactive association with an inorganic acid acceptor capable of generating water upon reacting with hydrogen fluoride to produce a cured elastomer having low compression set. The curable elastomeric composition or admixture comprises the following components:

(a) A fluorinated elastomeric copolymer of vinylidene fluoride and at least one terminally unsaturated fluoromonoolefin containing at least one fluorine atom substituent on each double bonded carbon atom, each carbon atom of said fluoromonolefin being substituted only with fluorine, chlorine, hydrogen or a lower fluoroalkyl or fluoroalkoxy radical, at least 10 percent of the chain carbon atoms of said copolymer being —CH$_2$— units;

(b) At least one quarternary ammonium or quarternary phosphonium compound of the formula $$[R_3{}^1Q\text{---}R^2\text{---}QR_3{}^3]^{+2}[X^{-m}]_{2/m}$$

$$[R^4\text{---}Q\text{---}R_3{}^5]^{+1}[X^{-m}]_{1/m}$$

wherein Q is a phosphorus or nitrogen atom, X is an anion (e.g. sulfate, acetate, phosphate, halide, hydroxide, alkoxide, phenoxide, etc.), $m$ is the valence of anion X (e.g. 1–3), $R^2$ is an alkylene radical having from 2 to 12 (preferably 2 to 6) carbon atoms or a phenylene dialkylene radical having from 8 to 12 carbon atoms (e.g. —CH$_2$—C$_6$H$_4$—CH$_2$—), $R^4$ is an alkyl radical having from 1 to 12 (preferably 1 to 6) carbon atoms or an aralkyl radical having from 7 to 12 carbon atoms, and wherein $R^1$, $R^3$ and $R^5$ represent alkyl radicals having from 1 to 18 (preferably 1 to 12, most preferably 1 to 6) carbon atoms;

(c) At least one aromatic hydroxy or amino compound which has an oxidation potential no more than 1.5 volts with respect to a standard calomel electrode; and (d) In a preferred embodiment the curable composition also includes at least one compound which is stable in the absence of water at temperatures below about 75° C. and which at a temperature above 125° C. and in the presence of water releases a basic nitrogen-atom containing compound having at least one hydrogen atom bonded to said basic nitrogen atom. Preferably the compound is one which releases a primary or secondary amine, a hydrazine or ammonia.

Although the mechanism is not fully understood, the combination of of each of the above components in vulcanization system displays an effect not attributable to any one specific component or any combination less than the required components of the above curing system, resulting in a drastic reduction in the compression set of the cured product, i.e. less than 20 percent compression set and generally less than about 10 percent compression set after exposure to 400° F. (205° C.) for 24 hours, and also resulting in a complete cure with essentially no residual effective curing agent, all of which is accomplished with a low concentration of curing ingredients, as will be hereinafter discussed. Another valuable attribute of the above curing system is the greater latitude permissible in the formulation, and minor changes in the proportions of the components within the specified limits do not drastically effect the processability, particularly its ability to be milled without scorching and yet to cure rapidly.

The vulcanizable polymers which are cured according to this invention are linear, saturated, fluorinated polymers which contain reactive substituents selected from the group consisting of hydrogen, fluorine and chlorine and which are at least half halogenated. By "half halogenated" is meant that at least one half of the carbon bonded hydrogen atoms of the analogous nonhalogenated polymer are replaced by halogen. The preferred vulcanizable polymers are at least half fluorinated; however, it is critical that the polymer chain include —$CH_2$— units. Homopolymers of tetrafluoroethylene and other perfluorinated olefins, and copolymers thereof with other perfluorinated comonomers require very high temperature to effect crosslinking and are not within the scope of this invention.

Linear fluorinated elastomers generally contain disordered, saturated, fluorinated carbon chains which include a substantial number of —$CH_2$— units, usually at least 10 percent of the chain carbon atoms. Disorders in the carbon chains is ordinarily achieved by the copolymerization of at least two monoolefinic compounds of the type hereinafter described. When one of the monoolefinic compounds contains an unsaturated chain of three or more carbon atoms, alkyl side groups, e.g. methyl, ethyl, etc., are present in the final polymer, and these alkyl groups are preferably perhalogenated, most preferably perfluorinated. Points of unbalance in the carbon chain, which are necessary for elastomeric properties, are provided by these side groups. Such side groups cause a bending of the linear carbon chain and thus provide additional degrees of freedom in space, producing an unsymmetrical chain carbon atom to which they are attached. However, unbalance is also provided by the presence of other unsymmetrical units in the linear carbon chain, such as —CFCl—. Irrespective of the units providing such points of unbalance, whether by two physically different substituent atoms or by a side group on a chain carbon atom, at least 10 percent of the chain carbon atoms should be unbalanced.

The linear, saturated, fluorinated carbon chain in the elastomers may also contain chlorine substituents, provided a single chain carbon atom has no more than one chlorine attached thereto to produce instability or to influence the chemical nature of the elastomer. The presence of more than one chlorine substituent on a single chain carbon atom produces a point of rigidity in the chain, decreasing the flexibility of the chain and the elastomeric properties accordingly.

Among the saturated polymers which may be crosslinked in accordance with this invention are the fluorinated elastomeric copolymers of chlorotrifluoroethylene, vinylidene fluoride, 2-chloroperfluoropropene, a fluorinated methyl vinyl ether, perfluoropropene, tetrafluoroethylene, 1-hydroperfluoropropene (i.e. $CFH=CFCF_3$), dichlorodifluoroethylene, trifluoroethylene, 1, 1-chlorofluoroethylene and vinylidene chloride. These monoolefins may be copolymerized with each other in groups of two or more. They may also be copolymerized with other olefinic compounds such as ethylene. The preferred elastomers are copolymers of vinylidene fluoride with at least one terminally unsaturated fluoromonoolefin containing at least one fluorine atom substituent on each double bonded carbon atom, each carbon of said fluoromonoolefin being substituted only with fluorine, chlorine, hydrogen or a lower fluoroalkyl (e.g. perfluoroalkyl) or fluoroalkoxy radical, particularly perfluoropropene, tetrafluoroethylene, chlorotrifluoroethylene and 1-hydroperfluoropropene. Particularly preferred are the fluorinated elastomers produced by copolymerizing perfluoropropene and vinylidene fluoride, as described in U.S. Pat. Nos. 3,051,677, issued Aug. 28, 1962 and 3,318,854, issued May 9, 1967, and those terpolymers produced by copolymerizing perfluoropropene, vinylidene fluoride and tetrafluoroethylene as described in U.S. Pat. No. 2,968,649, issued Jan. 17, 1961. The elastomeric copolymers of perfluoropropene and vinylidene fluoride having between about 15 and about 50 mole percent perfluoropropene are outstanding in this respect.

A critical ingredient in the final curable composition is at least one oxidizable aromatic hydroxy or amino compound which has an oxidation potential no greater than 1.5 volts preferably no greater than 1 volt, with respect to a standard saturated calomel electrode and which is free of electron attracting groups as substituents on the aromatic nucleus. Oxidation potentials are conveniently measured by conventional cyclic voltammetry, using a platinum electrode and the compounds at concentrations of about $10^{-3}$ mol per liter in substantially anhydrous dimethylformamide, including 0.2 mole/liter of a soluble conductivity aid, such as sodium perchlorate. Among those compounds oxidizing between about 1 and 1.5 volts in this test are phenol, meta-cresol, resorcinol, catechol, bis-phenol A [i.e. 2,2-bis(p-hydroxyphenyl) propane] and p-bromophenol. Among those compounds oxidizing at no more than about 1 volt are p-dihydroxybenzene, o-dihydroxybenzene and pyrogallol. The preferred aromatic hydroxy or amino compounds are represented by the general formula:

$$ArZ_n$$

wherein Z represents an —OH or —$NH_2$ aromatic ring substituent, $n$ represents an integer from 1 to 2, and Ar represents an n-valent aromatic nucleus (e.g. phenyl, naphthyl). Preferably the aromatic nucleus is unsubstituted but it may also be substituted. If substituted, electron-donor groups such as alkyl, alkoxy, aryl, aryloxy, and aralkyl are preferred, since electron attracting substituent groups such as halogen, nitro, carboxyl, and the like result in an aromatic compound which, unless used with a more severe curing cycle, tends to produce a cured elastomer with higher compression set. Hydroquinone, i.e. p-dihydroxybenzene, is a particularly preferred compound.

The composition also includes at least one quaternary ammonium or quaternary phosphonium compound of the formula recited earlier. Typical quaternary ammonium compounds include:

$(CH_3)_4N^+OH^-$, $[(C_4H_9)_4N]^+[OH^-]$ $[(CH_3)_3NCH_2C_6H_5]^+[OH^-]$ $[(C_4H_9)_3NCH_2CH_2N(C_4H_9)_3]^{+2}[OH^-]_2$ $[(CH_3)_3NCH_2C_6H_4CH_2N(CH_3)_3]^{+2}[OH^-]_2$ and the corresponding salts thereof, such as tetrabutylammonium bromide. Quaternary phosphonium compounds include, for example,

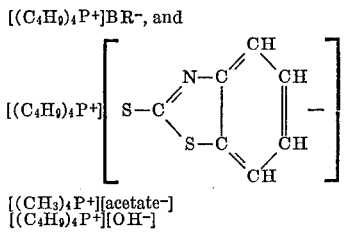

[(CH₃)₄P⁺][acetate⁻]
[(C₄H₉)₄P⁺][OH⁻]

The quaternary compounds are conveniently admixed with the fluoroelastomer as a solution in an inert, volatile solvent, such as methanol, although many of the compounds can also be introduced to the curable elastomer in the form of finely divided solids. The salts of these quaternary compounds are generally preferred over the corresponding hydroxides because of their better stability.

A further component in the final curing recipe is an inorganic acid acceptor capable of generating water upon reacting with hydrogen fluoride. Suitable acid acceptors are bases and include magnesium oxide, lead oxide (litharge, PbO), dibasic lead phosphite and zinc oxide, with magnesium oxide being preferred. The acid acceptors are used in amounts ranging from 2 to 25 parts per 100 parts of polymer. In addition an "optional base" is generally desired as a cure accelerator. These optional bases are basic compounds and include inorganic oxides and hydroxides such as calcium hydroxide, barium carbonate, strontium hydroxide, and the like. The optional bases are preferably used in amounts ranging from 0.5 to 10 parts per 100 parts of polymer.

Although not necessary, the composition preferably contains at least one aromatic amine (primary, secondary or tertiary), aliphatic tertiary amine, or a compound which is stable in the absence of water at temperatures below about 75° C. and which at temperatures above about 125° C. in the presence of water generates a basic nitrogen atom-containing compound (i.e. a compound having a $pK_b$ in water of no more than about 14) having at least one hydrogen atom bonded to said basic nitrogen atom (preferably generates a primary or secondary amine, a hydrazine or ammonia, all of which will be referred to herein as "amines." Amines having too high a molecular weight diffuse less efficiently through the fluorocarbon polymer during the curing process, thus tending to result in uneven cure and inferior physical properties of the resulting vulcanizate. Generally, a satisfactory cure can be obtained most effectively with an amine having a molecular weight of not more than about 1000, and in most cases an amine having a molecular weight of not more than about 500 is preferred. In order to obtain optimum physical properties, particularly resistance to changes during aging and resistance to solvents, it is desirable that the amine equivalent weight (i.e. total molecular weight divided by the number of basic nitrogen atoms in the molecule) in the free amine should be no greater than about 500, and preferably no greater than about 300.

For purposes of this discussion, compounds which generate a basic nitrogen atom-containing compound, while considered "amines" as mentioned above, will also be more particularly referred as "amine generators," the preferred amine generators being further characteized as "amine adducts" or "carbonyl adducts." It is to be understood that while the amine generators of this invention must be capable of generating an amine in the presence of water, certain of the useful amine generators are also capable of generating an amine in the presence or absence of water, e.g. carbamates, urethanes, carbodiimides, thiourethanes, etc.

The mechanism of curing saturated copolymers of vinylidene fluoride with, for example, perfluoropropene, is not fully understood. Existing evidence suggests that the initial press cure involves a base-catalyzed release of hydrogen fluoride to generate double bonds in the polymer, these double bonds then providing a limited number of crosslinks between the polymer chains which serve to stabilize the shape and form of the polymer, while the subsequent post cure step results in the formation of further ethylenically unsaturated structures which combine to form benzenoid crosslinks of high thermostability. This is consistent with our findings that a variety of compositions function as curing or crosslinking agents, acting to aid in the release of hydrogen fluoride. Most free primary or secondary aliphatic amines (insofar as they are not in themselves amine generators), free hydrazine or free ammonia are not suitable as curing agents, and their use as such results in either too rapid a cure rate or no cure at all.

It is convenient to consider the preferred carbonyl adduct as derived from the reaction of a carbonyl compound and an amine, and in most cases the adduct may be prepared in this manner. However, carbonyl adducts within the scope of this invention may also be prepared by alternative syntheses which are chemically equivalent. Carbonyl adducts which thermally or upon reaction with one or more molecules of water generate the same amine act in the formulation as equivalents. For example hexylisocyanate and hexane carbodiimide as well as hexylcarbamate, N-hexylacetamide are considered herein as equivalent carbonyl adducts of hexylamine and either carbon dioxide or acetic acid, since they liberate the same amine, as is shown by the following reaction:

$[C_6H_{13}NHCO_2]^-[C_6H_{13}NH_3]^+$   $2C_6H_{13}NH_2+CO_2$
$C_6H_{13}N=C=HC_6H_{13}+2H_2O$   $2C_6H_{13}NH_2+CO_2$
$C_6H_{13}NCO+H_2O$   $C_6H_{13}NH_2+CO_2$
$(C_6H_{13}NCO)_2+2H_2O$   $2C_6H_{13}NH_2+2CO_2$
$CH_3CONHC_6H_{13}+H_2O$   $C_6H_{13}NH_2+CH_3CO_2H$ $(C_6H_{13}NH)_3P=O$ is not an equivalent carbonyl adduct of hexylamine, since it does not liberate a carbonyl derivative, but is regarded as a useful amine generator because it generates a suitable amine.

The carbonyl moiety of the carbonyl adduct is generally derivable from carbon dioxide, carboxylic (including polycarboxylic) acids, aldehydes or ketones. The preferred aldehydes and ketones and carboxylic acids are represented by the general structural formulae: $R_2^6C=O$; $R^6(COOH)_{1-4}$; wherein $R^6$ represents hydrogen, an alkyl (including cycloalkyl) radical of 1 to 25 (preferably 1 to 12) carbon atoms, an aralkyl radical of 7 to 25 carbon atoms, or an aryl (including alkaryl) radical of 6 to 25 carbon atoms. Two alkyl radicals may be combined to form an alicyclic divalent radical, e.g. cyclohexanone,

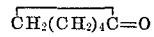

Exemplary adducts include:

(1) Aldehyde—ammonia adducts, e.g.,

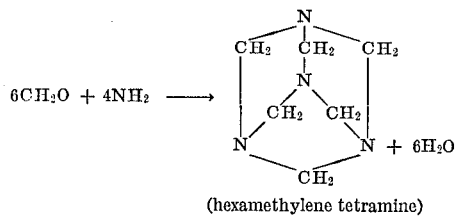

(hexamethylene tetramine)

(2) Aldehyde—primary amine adducts, e.g., $R^6CH=O+H_2NR^7 \rightarrow R^6CH=NR^7+H_2O$ (3) Aldehyde—secondary amine adducts, e.g., $R_2^6CHCH=O+HNR^7R^8 \rightarrow R_2^6C=CHNR^7R^8+H_2O$ (4) Ketone—primary amine adducts, e.g., $R_2^7C=O+H_2NR^7 \rightarrow R_2^7C=NR^7+H_2O$ (5) Ketone—secondary amine adducts, e.g., $$R_2^6CHCOR^7 + HNR^7R^8 \rightarrow R_2^6C=CR^7NR^7R^8 + H_2O$$

(6) $CO_2 + 2H_2NR^7 \rightarrow [R^7NHCO_2^-][R^7NH_3^+]$

In the above formula $R^6$ is as defined earlier; $R^7$ and $R^8$ may be selected independently from the group consisting of aromatic radicals of 6 to 25 (preferably 6 to 12) carbon atoms, unsubstituted, saturated aliphatic radicals of 1 to 25 (preferably 1 to 18, most preferably 1 to 6) carbon atoms (e.g., alkyl and cycloalkyl) and araliphatic radicals of 7 to 25 (preferably 7 to 12) carbon atoms.

While the above illustrations exemplify monoamino compounds, polyamino (including diamino) compounds are equally useful and in some cases preferred. For example, in place of ammonia, hydrazine ($H_2N-NH_2$) can be used; in place of hexylamine, $H_2N-(CH_2)_5CH_3$, hexamethylenediamine, $H_2N(CH_2)_5CH_2NH_2$, can be used; in place of $C_6H_5NHC_{18}H_{37}$, $C_6H_5NHC_{36}H_{72}NHC_6H_5$ can be used, and so on. At least one of the amino groups is combined in the form of a carbonyl adduct, but alternatively more than one, or all, may be so combined. For simplicity and convenience, a symmetrical compound is preferred, but an unsymmetrical compound, such as 6-methylaminohexylamine, is equally suitable.

It should be noted that aldehyde and ketone compounds, to react with a secondary amine in the preparation of a carbonyl adduct, must have at least one hydrogen substituent on at least one carbon atom adjacent to the carbonyl carbon. Carbon-bonded substituents such as hydroxyl or halogen (e.g., chlorine or fluorine), generally interfere neither with the formation of carbonyl adducts nor with the ability of such adducts to function as curing agents.

The most preferred amine generators of this invention are either dialdehyde aliphatic diamine adducts (i.e. dialdimine) of the general formula:

$$R^7-CH=(CH-CH=)_mN(C_nH_{2n})$$
$$N(=CH-CH)_m=CHR^7$$

wherein $R^7$ is as defined above, $m$ is 0 or 1 and $n$ is 2 to 36, preferably 2 to 6; or a carbamate of the general formula:

$$YHN-C_nH_{2n}-X$$

wherein Y is a hydrogen atom, an alkyl radical of 1 to 6 carbon atoms or an aryl radical of 6 to 12 carbon atoms (preferably Y is a hydrogen atom), X is a carbamic radical, and $n$ is 2 to 36, preferably 2 to 6.

The amine generator may be incorporated directly into the elastomeric material to be cured or, in the case of carbonyl adducts, the respective components or precursors thereof may be introduced into the curable elastomeric material when their reaction in situ occurs to form the desired amine adduct, for example, during the milling or mixing of the rubber formulation prior to cure.

A particularly useful amine generator of the present invention is cinnamylidenetrimethylenediamine. The most preferred amine generators are produced in known manner by reaction of an aliphatic or cycloaliphatic diamine with an aldehyde or with carbon dioxide. Illustrative adducts of the diamine with carbon dioxide (i.e. carbamates) are shown in U.S. 3,096,314 and described in conjunction with the curing of highly fluorinated elastomers.

The following are examples of aldehyde-diamine adducts useful in the practice of the invention as well as the aldehydes and amines from which they are produced.

| Aldehydes | Amines | Adducts |
|---|---|---|
| $C_5H_{11}$—⬡—CH=O | $H_2NCH_2CH_2NH_2$ | $[C_5H_{11}$—⬡—CH=N—CH$_2]_2$ |
| ⬡(—CH=O)(—OCH$_3$) | $H_2N(CH_2)_3NH_2$ | $[⬡(—CH=N—CH_2)(—OCH_3)]_2$—CH$_2$ |
| ⬡(—CH=O)(—OH) | $H_2N(CH_2)_3NH_2$ | $[⬡(—CH=N—CH_2)(—OH)]_2$—CH$_2$ |
| CH$_3$CH=O | $H_2NCH(CH_3)CH_2NH_2$ | CH$_3$CH=NCH(CH$_3$)CH$_2$N=CCH$_3$ |
| ⬡—CH$_2$CH$_2$—CH=O | $H_2N(CH_2)_2NH_2$ | $[⬡—CH_2CH_2C=NCH_2—]_2$ |
| $C_5H_{11}$CH=O | $H_2N(CH_2)_3NH_2$ | $(C_5H_{11}CH=N—CH_2)_2$—CH$_2$ |
| ⬡—CH=CH—CH=O | $H_2N(CH_2)_2NH_2$ | $[⬡—CH=CH—CH=N—CH_2—]_2$ |

Other useful amine generators include complexes of amines with transition elements, such as nickel, iron and cobalt (as illustrated by the complexes prepared by reacting three moles of ethylenediamine with one mole of nickel or cobalt acetate in alcohol solution) and also include complexes of metal such as silver and zinc. Compounds equivalent to the amines, such as triphenylstibine, triphenylbismuthine, triphenylarsine, dibutyl tin sulfide and tributylphosphine, may also be employed in similar fashion as the "amine."

The quaternary compound, alone or premixed with a suitable amine, may be conveniently milled into the elastomer gum stock. Thus mixed, the stock can be stored at room temperature (i.e. about 80° F. or 27° C.) for extended periods, e.g. at least six months. Prior to curing, the oxidizable aromatic hydroxy or amino compound and the acid acceptors are milled into the stock, after which the storage life at ambient temperatures is more limited and molding or extruding the product within about two to three weeks is recommended. Of course, all of the components of the curing system may be admixed prior to their incorporation into the elastomer without departing from the scope of this invention. It may also be desirable in some instances to employ retarding agents, plasticizers, fillers, and other conventional additives.

The proportions of components of the curing system are set forth below in parts by weight. (All amounts referred to herein are in parts per 100 parts of polymer abbreviated "pphr.," unless otherwise indicated.) These proportions are general ranges and the particular amount for each particular cure, time and temperature will become apparent to those skilled in the art.

TABLE I.—FORMULATION LIMITS

| Component: | Parts phr. (range) |
| --- | --- |
| Amine | [1] 0–2.5 |
| Quaternary compound | 0.05–0.5 |
| Acid acceptor | 2–25 |
| Optional base | 0–10 |
| Oxidizable hydroxy or amino compound | 0.1–2 |

[1] Preferably 0.1–2.5.

Although low compression set elastomers are obtained within the aforementioned formulation limits, elastomeric products having compression set values of 10 or less may be obtained by varying the relative amounts of the components listed in Table I within the specified ranges. Preferably the quaternary ammonium or phosphonium compounds are added in solution in a solvent such as methanol.

Use of larger amounts of amine tends to increase the cure rates and provide a tighter cure. However, excessive amounts may promote excessive curing or aging and to effect, for example, higher compression set values and lower elongation values. Generally, when an amine is used, the lowest amount of amine which will provide the desired rate of cure and level of compression set at practical curing temperatures is preferred and, in fact, amounts much in excess of about 2.5 pphr. are undesirable because of the adverse effect on heat aging properties.

Quaternary ammonium and phosphonium compounds, when used in amounts as small as 0.05 pphr., produce a measurable acceleratory effect on cure rate at a given amine concentration. An excess of the quaternary compound, over 0.4 pphr., particularly when more than about 0.5 pphr., tends to effect an overcured vulcanizate, although in general the higher molecular weight quaternary compound can be used in greater amounts than those of lower molecular weights. Generally, the lower the amount of amine employed, the greater the optimum amount of the quaternary compound. The preferred proportions in an exemplary system using tetrabutylammonuim hydroxide and cinnamylidene trimethylenediamine are illustrated in the drawings, and are represented by the shaded area of the graph. The following equation describes these preferred proportions:

$$x \pm 0.1 = 0.3 (1 - y/2)$$

wherein $x$ is the amount of hydroxide in pphr., $y$ is the amount of amine in pphr., $x$ being greater than or equal to 0.05 and $y$ being greater than or equal to 0.25.

Of the acid acceptors, magnesium oxide is preferred. At least about 2 pphr. is required to provide a reasonable level of cure and rate of cure. The maximum amount for the acid acceptor as listed in Table I is not critical, as much as 50 to 60 pphr. producing a usable but hard stock. Generally, however, no more than about 25 parts is necessary for adequate curing. Alternatively, zinc oxide, litharge or dibasic lead phosphite may be used in approximately the same proportions, and calcium oxide may sometimes be used.

In addition to the above acid acceptor, when an optional base is desired as an accelerator, it is usually present in amounts of from about 0.5 to 10.0 pphr. Calcium hydroxide is preferred, barium carbonate being milder and generally being used in somewhat larger amounts.

Fillers are often added to the polymers discussed above to improve the molding characteristics and other properties. When a filler is employed it is added to the vulcanization recipe in amounts of up to about 100 parts pphr., preferably between about 15 and about 50 parts. Examples of fillers which may be used are reinforcing thermal grade carbon blacks or non-black pigments of relatively low reinforcement characteristics such as clays, barytes, etc. Plasticizers, softeners and processing aids, preferably esters or ketones, may also be added if desired.

In accordance with this invention, the desired amount of the components of the crosslinking system is added to the unvulcanized fluorocarbon polymer (i.e. gum stock) and is intimately admixed therewith or compounded by employing any the usual rubber mixing devices, such as Banbury mixers, roll mills, or any other convenient mixing device. It has been found that a two-roll rubber mill equipped with heat exchange means, e.g. cored chambers for cooling, is particularly suitable since the heat generated by the high shearing forces in mixing can be dissipated and the temperature more accurately regulated with this device or with devices providing other means for temperature control.

For best results the temperature of the mixture on the mill is not allowed to rise above about 250° F. (120° C.) and is not allowed to fall below 30° F. (0° C.). During milling it is necessary to distribute the crosslinking agent uniformly throughout the curable polymer. However, it is also desirable to prevent extensive crosslinking in the compounding step since most of these fluorinated polymers cannot be molded or extruded after a substantial amount of crosslinking has taken place.

The curing process typically comprises pressing the compounded mixture in a mold and then baking the pressing in an oven. Pressing of the compounded mixture (press cure) is conducted at a temperature between about 200° F. (95° C.) and about 450° F. (230° C.), preferably between about 300° F. (150° C.) and about 400° F. (205° C.) for a period of from 1 minute to about 15 hours, usually from 5 minutes to 30 minutes. A pressure of between about 7 and about 210, preferably between about 35 and about 70, kg./cm.$^2$ is imposed on the compounded mixture in the mold. The molds may be first coated with release agents, such as a silicone oil, and prebaked. The molded vulcanizate is then usually post cured (oven cured) at a temperature between about 300° F. (150° C.) and about 600° F. (315° C.), usually at about 400° F. (205° C.) for a period of from 2 hours or less to 50 hours depending on the cross-sectional thickness of the sample. The temperature during the post cure is usually raised gradually from the lower limit of the range to the desired maximum temperature selected. The maximum temperature used is preferably about 500° F. (260° C.) and is held at this value for at least 24 hours.

The following examples are offered as a better understanding of the present invention and was not to be unnecessarily construed as limiting the scope thereof. In the tion with a diamine carbamate produces cure fluorinated elastomers which, after 70 hours at only 250° F. (120° C.) have compression set values of 30 to 60%. From the

TABLE A

| Run | I | II | III | IV | V |
|---|---|---|---|---|---|
| Elastomer ($C_3F_6/CF_2=CH_2$, 24/76 mole ratio) | 100 | 100 | 100 | 100 | 100 |
| MgO | 10 | 10 | 10 | 10 | 10 |
| Carbon black | 20 | 20 | 20 | 20 | 20 |
| Cinnamylidenetrimethylenediamine | 2 | 0.7 | 0.3 | 0.5 | 0.5 |
| Tetrabutyl ammonium hydroxide | | 0.1 | 0.3 | 0.2 | 0.2 |
| Hydroquinone | 1 | 0.5 | 2 | 2 | 1 |
| $Ca(OH)_2$ | 1 | 3 | 1 | 1 | 1 |
| CaS | 0.5 | | | 0.5 | 0.5 |
| Mooney 10 pt. rise at — | | | | | |
| 250° F. (120° C.) | >25 min. | >25 min. | | >25 min. | >25 min. |
| 330° F. (165° C.) | 3.0 | 2.5 | | 6.5 | 6.0 |
| Compression set: | | | | | |
| 1 day at 400° F. (205° C.) | 10 | 7 | 4.5 | 6 | 3 |
| 7 days at 400° F. (205° C.) | 32 | 24 | | 18 | 14 |
| 7 days at 347° F. (175° C.) | 18 | 12 | | 7 | 9 |
| 3 days at 77° F. (25° C.) | 7 | 5 | | 3 | 6 |
| Tensile at break, p.s.i. (kg./cm.$^2$): | | | | | |
| A* | 2,120 (148) | 1,870 (132) | | 2,075 (145) | 2,015 (140) |
| B** | 650 (45) | 540 (38) | | 520 (36) | 420 (29) |
| Elongation at break (percent): | | | | | |
| A | 220 | 260 | | 270 | 330 |
| B | 80 | 180 | | 160 | 220 |
| Hardness, shore A$_2$: | | | | | |
| A | 71 | 69 | | 70 | 68 |
| B | 78 | 69 | | 71 | 68 |
| Modulus at 100% elongation: | | | | | |
| A | 220 (15) | 455 (32) | | 475 (33) | 320 (22) |
| B | ($^1$) | 415 (29) | | 370 (26) | 260 (18) |

$^1$ Broke.
*A=data from post-cured sample.
**B=data from post-cured sample after accelerated aging (i.e. 16 hours at 316° C.).

examples, indicated results were obtained using the following test methods:

| | |
|---|---|
| Mooney scorch | ASTM D 1646–63 using the small rotor. |
| Compression set | ASTM D 395–61 method B using a 1″ (25 mm.) diameter×.5″ (12.5 mm.) thick sample compressed to 0.375″ (9.5 mm.) for the indicated time at the indicated temperature. One half hour was allowed after the release of pressure for relaxation and temperature and equilibration. |
| Tensile strength at break, elongation at break, modulus at 100% elongation. | ASTM D 412–62T on a sample cut from 0.07″ (1.8 mm.) sheet with a die having the following dimensions: A=0.125″(3.5 mm.) L=0.75″(19 mm.) C=2.0″(51 mm.). |
| Accelerated aging | ASTM D 573–53 exposed for 16 hours at 600° F. (315° C.). |
| Press cure | Unless otherwise noted sheets were prepared 3″× 6″×0.07″ (75×150×1.8 mm.) pressed at about 1,000 p.s.i. (70 kg./cm.$^2$) for 20 minutes at 320° F. (160° C.) for physical property determinations; plugs for compression set were 1″ (25 mm.) diameter×0.5″ (12.5 mm.) thick, pressed at about 2,000 p.s.i. (140 kg./cm.$^2$) for 30 minutes at 320° F. (160° C.). |
| Post cure | Samples were removed from the press and placed in a circulating air oven. The oven was maintained at 300° F. (150° C.) for 2 hours, increased to 350° F. (175° C.) and held for 2 hours, increased to 400° F. (205° C.) and held for 20 hours, then increased to 500° F. (260° C.) and held for 24 hours (unless otherwise noted, see Ex. IX–XII). |

EXAMPLE I

The interrelated effects on rate of cure, physical properties and stability toward aging due to variations in amounts of amine, quaternary compound, oxidizable aromatic hydroxy or amino compound, and optional base are demonstrated by the results of the tests indicated in Table A.

The data in Table A illustrate the value of using an amine together with a quaternary compound and an oxidizable aromatic hydroxy compound. Run I shows the results obtained with the omission of the quaternary compound, and Runs II–V show results obtained with varying amounts of the quaternary compound in the formulation of this invention. In Run I the compression set is significantly higher than in Runs II–V. In addition, the higher level of amine required in Run I produces much poorer aging, as represented by greatly decreased elongation at break, greatly increased hardness, and an inability to obtain a 100 percent modulus because of the very low elongation due to aging after post cure. This aging is an indication of the manner in which the cured elastomer will function during actual use.

In Example 1 of U.S. Patent No. 2,951,832 a formulation using a diamine adduct both alone and in combination with a diamine carbamate produces cure fluorinated elastomers which, after 70 hours at only 250° F. (120° C.) have compression set values of 30 to 60%. From the compression set data in Table A of the present example, a reduction in the temperature from 400° F. (205° C.) to 350° F. (175° C.) results in a decrease of compression set of from 14–24% to 9–12%, and a further decrease of the temperature to 250° F. (120° C.) would clearly still further decrease the compression set values. This illustrates the significant improvement in compression set of the curing formulations of the present invention.

EXAMPLE II

The effect on cure results of varying the amount of hydroquinone was observed using a formulation having the following components and the amounts of hydroquinone noted in Table B:

Elastomer ($C_3F_6/CF_2=CH_2$, 24/76 mole ratio)—100 parts
MgO—10 pphr.
Carbon black—20 pphr.
$Ca(OH)_2$—1 pphr.
Cinnamylidenetrimethylenediamine—0.5 pphr.
Tetrabutylammonium hydroxide—0.2 pphr.
CaS—0.5 pphr.

TABLE B

| Sample | Hydroquinone (pphr.) | Cure conditions | Cure results |
|---|---|---|---|
| 1 | 0 | 320° F. (160° C.), 20 minutes | Blown. |
| 2 | 0 | 395° F. (200° C.), 5 minutes | No cure. |
| 3 | 0.25 | 320° F. (160° C.), 20 minutes | Good. |
| 4 | 0.5 | 320° F. (160° C.), 20 minutes | Do. |
| 5 | 0.5 | 395° F. (200° C.), 5 minutes | Do. |
| 6 | 1.0 | 395° F. (200° C.), 5 minutes | Do. |
| 7 | 2.0 | 395° F. (200° C.), 5 minutes | Do. |

At 0.1 pphr. hydroquinone slightly increased amounts of diamine adduct, tetrabutylammonium hydroxide and/or calcium hydroxide are required to obtain acceptable cure results.

EXAMPLE III

Using the following formulation:

Elastomer ($C_3F_6/CF_2=CH_2$, 24/76 mole ratio)—100 parts.
MgO—10 pphr.
Carbon black—20 pphr.
$Ca(OH)_2$—1 pphr.
CaS—0.5 pphr.
Hydroquinone—2 pphr.

several samples were prepared with varying amounts of hexamethylenediaminecarbamate, containing 0.5, 1.0 and 1.5 parts by weight respectively. Each sample was subjected to a press cure as in Example 1 for 30 minutes at 325° F. (165° C.). In none of the samples was a cure obtained. These samples indicate the need for the quaternary ammonium hydroxide to effect a satisfactory cure in a hydroquinone-containing system for the production of a rubber having good physical properties, including low compression set.

EXAMPLE IV

This experiment shows the effect using various diamine adducts in a standard formulation consisting of:

Elastomer ($C_3F_6/CF_2=CH_2$, 24/76 mole ratio)—100 parts.
Carbon black—20 pphr.
MgO—10 pphr.
Ca(OH)$_2$—1 pphr.
Tetrabutylammonium hydroxide—0.2 pphr.
Hydroquinone—1 pphr.

The adducts were added in approximately equimolar quantities, the compounded stock milled, molded and post-cured as in Example I, and properties determined as follows:

| | | | | | |
|---|---|---|---|---|---|
| Cinnamylideneethylenediamine | ¹0.5 | | | | |
| Cinnamylidenetrimethylenediamine | | ¹0.5 | | | |
| Cinnamylidenehexamethylenediamine | | | ¹0.6 | | |
| Trimethylenediaminecarbamate | | | | ¹0.25 | |
| Hexamethylenediaminecarbamate | | | | | ¹0.25 |
| Mooney, 10 point rise at 167° C., minutes | 4.7 | 4.5 | 3.4 | 4.2 | 3.5 |
| Compression set, percent 1 day at 205° C | 6 | 6 | 5 | 7 | 6 |
| Tensile strength at break, p.s.i. (kg./cm) A | 2,040 (142) | 2,360 (165) | 2,000 (140) | 2,080 (146) | 2,100 (147) |
| Tensile strength at break, p.s.i. (kg./cm.²) B | 580 (41) | 560 (39) | 710 (50) | 630 (44) | 550 (38) |
| 100% modulus, p.s.i. (kg./cm.²) A | 450 (31) | 510 (36) | 720 (50) | 380 (27) | 420 (39) |
| 100% modulus, p.s.i. (kg./cm.²) B | 580 (41) | | | 460 (32) | |
| Elongation at break, percent A | 240 | 200 | 220 | 260 | 210 |
| Elongation at break, percent B | 100 | 90 | 90 | 160 | 95 |
| Shore A$_2$ hardness, A | 70 | 70 | 70 | 71 | 70 |
| Shore A$_2$ hardness, B | 75 | 71 | 73 | 70 | 74 |

¹ Parts per 100 parts of polymer.
A=data from post-cured sample.
B=data from post-cured after accelerated aging.

EXAMPLE V

To illustrate the equivalence of various aldehyde adducts, mixtures were prepared according to the formulation in Table B except that hydroquinone was maintained at 1 pphr. and various dialdehyde adducts of trimethylenediamine were used each at 0.5 pphr. The materials were molded and post-cured. The compression set data are shown in Table C.

TABLE C

| Adduct | Compression set, percent | |
|---|---|---|
| | 1 day at 205° C. | 7 days at 175° C. |
| $\left(\bigcirc\!\!-CH=CH-CH=NCH_2\!\!-\right)_2\!\!CH_2$ | 6 | 7 |

TABLE C—Continued

| Adduct | Compression set, percent | |
|---|---|---|
| | 1 day at 205° C. | 7 days at 175° C. |
| $\left(C_6H_{13}CH=NCH_2\!\!-\right)_2\!\!CH$ | 5 | 6 |
| $\left(\bigcirc\!\!\begin{array}{c}-CH=NCH_2\!\!-\\-OCH_3\end{array}\!\!-CH_2\right)_2$ | 4 | 4 |
| $\left(\bigcirc\!\!-CH=NCH_2\!\!-CH_2\right)_2$ | Cracked | 6 |
| $\left(\bigcirc\!\!\begin{array}{c}-CH=NCH_2\!\!-\\-OH\end{array}\!\!-CH_2\right)_2$ | 5 | 5 |

EXAMPLE VI

The effect of various readily oxidized aromatic amines and phenols is shown in Table D.

A standard formulation was prepared from:

Elastomer ($C_3F_6/CF_2=CH_2$, 24/76 mole ratio)—100 parts
Carbon black—20 pphr.
MgO—10 pphr.
Ca(OH)$_2$—1 pphr.
Tetrabutylammonium hydroxide—0.2 pphr.
Cinnamylidenetrimethylenediamine—0.5 pphr.
Aromatic compound—1 pphr.

The materials were milled to a uniform dispersion, then sheets and plugs prepared as described above. Sheets were press cured for 20 minutes at 335° F. (165° C.) and plugs for 30 minutes at 320° F. (160° C.), then post cured and tested. The pertinent results are summarized in Table D.

TABLE D

| Aromatic compound | Compression set, percent* | Tensile P.s.i. | Tensile Kg./cm.² | 100 percent p.s.i. | Modulus, kg./cm.² | Elongation,** percent |
|---|---|---|---|---|---|---|
| Phenol | 15 | 1,880 | 132 | 410 | 29 | 270 |
| o-Dihydroxybenzene | 16 | 2,000 | 140 | 340 | 24 | 270 |
| m-Dihydroxybenzene | 12 | 2,050 | 144 | 440 | 31 | 230 |
| p-Dihydroxybenzene | 6 | 2,360 | 165 | 510 | 36 | 200 |
| m-Methyl phenol | 13 | 2,560 | 179 | 750 | 52 | 260 |
| p-Methyl phenol | 13 | 2,600 | 182 | 610 | 43 | 230 |
| m-Amino phenol | 10 | 2,530 | 177 | 1,605 | 112 | 140 |
| m-Phenylenediamine | 14 | 2,170 | 152 | 950 | 66 | 190 |
| p-Phenylenediamine | 12 | 2,500 | 175 | 1,280 | 90 | 180 |
| 2,2 bis(p-hydroxyphenyl)propane | 11 | 2,240 | 157 | 460 | 32 | 250 |
| p-Br phenol*** | 19 | 2,500 | 175 | 370 | 26 | 320 |

*24 hours at 400° F. (205° C.).
**Elongation at break.
***Formulation includes 3 pphr. Ca(OH)₂.

Aromatic hydroxy and amino compounds containing an electron-attracting group (e.g. p-Br phenol) generally require either larger amounts of optional base to provide a satisfactory cure under standard curing conditions, or more prolonged or higher temperature press cure.

EXAMPLE VII

This example compares the results obtained through use of a variety of amine carbonyl adducts.

A base formulation was prepared consisting of:

Elastomer ($C_3F_6/CF_2$=$CH_2$, 24/76 mole ratio)—100 parts
Carbon black—20 pphr.
MgO—10 pphr.
Ca(OH)₂—1 pphr.
Tetrabutylammonium hydroxide—0.2 pphr.
Hydroquinone—1 pphr.

This formulation, with the addition of the amount of amine generator indicated in Table E, were milled to a uniform dispersion and samples prepared as indicated in Example I. The pertinent test results are summarized in Table E. The amines liberated by the corresponding amine generators of Table E are set forth in Table F.

EXAMPLE VIII

This example demonstrates the properties obtained when the following elastomeric copolymer is employed: an elastomeric copolymer consisting of $$CFH=CFCF_3/CH_2=CF_2$$

in a mole ratio of 20/80 having a specific gravity of 1.816 at 25° C. and a Mooney Viscosity (ML 1+4, 100° C.) of 90, available under the trade name Tecnoflon-T from Montecatini Edison, S.p.A., Milan, Italy.

A formulation is prepared consisting of:

Elastomer ($C_3F_5H/CF_2$=$CH_2$, 20/80 mole ratio)—100 parts
Carbon black—20 pphr.
MgO—10 pphr.
Ca(OH)₂—2 pphr.
Tetrabutylammonium hydroxide—0.2 pphr.
Cinnamylidenetrimethylenediamine—0.5 pphr.
Hydroquinone—1 pphr.

The formulation was milled and cured as in Example VI. The following properties were determined:

Compression set, [24 hours at 400° F. (205° C.)]—18%
Tensile—3070 p.s.i. (215 kg./cm.²)
100% modulus—1070 p.s.i. (75 kg./cm.²)

TABLE E

| Run | Amine generator | Amount, pphr. | Compression* set, percent | Tensile p.s.i. | Tensile Kg./cm.² | 100% p.s.i. | Modulus, kg./cm.² | Elongation,** percent |
|---|---|---|---|---|---|---|---|---|
| 1 | Cyclohexylamine | 0.25 | | (¹) | | | | |
| 2 | 2-OH-ethylamine | 0.25 | | (¹) | | | | |
| 3 | Cinnamylidene cyclohexylamine | 0.5 | 11 | 2,510 | 175 | 440 | 31 | 260 |
| 4 | Cinnamylidene aniline | 0.5 | 8 | 2,305 | 161 | 965 | 68 | 150 |
| 5 | Cinnamylidene o-NO₂ aniline | 0.5 | 8 | 2,620 | 183 | 1,080 | 76 | 170 |
| 6 | $CH_3CH=N-\overline{CH(CH_2)_4CH_2}$ | 0.5 | 8 | 2,740 | 192 | 650 | 46 | 230 |
| 7 | $C_6H_{13}CH=N\overline{CH(CH_2)_4CH_2}$ | 0.5 | 8 | 2,900 | 202 | 430 | 30 | 300 |
| 8 | $(C_6H_5)_2C=N-\overline{CH(CH_2)_4CH_2}$ | 0.75 | 7 | 2,860 | 200 | 880 | 62 | 190 |
| 9 | $HOCO\overline{NCH_2(CH_2)_3CH_2}$*** | 0.25 | 7 | 2,475 | 173 | 630 | 44 | 220 |
| 10 | $HOCONH\overline{CH(CH_2)_4CH_2}$**** | 0.25 | 7 | 2,900 | 202 | 520 | 36 | 300 |
| 11 | Cinnamylidene methylamine | 0.25 | 10 | 2,500 | 175 | 660 | 46 | 240 |
| 12 | Cinnamylidene 2-OH-ethylamine | 0.5 | 7 | 2,280 | 159 | 415 | 29 | 250 |
| 13 | Cinnamylidene-2-methoxyethylamine | 0.5 | 6 | 2,160 | 151 | 455 | 32 | 200 |
| 14 | Cinnamylidene trimethylene diamine | 0.5 | 7 | 2,250 | 157 | 1,400 | 98 | 140 |
| 15 | $C_6H_5(CH_3)C=N(CH_2)_3-N=C(CH_3)C_6H_5$ | 0.5 | 6 | 1,915 | 134 | 1,270 | 89 | 170 |
| 16 | $[(CH_3)_2C(OH)CH_2-C(CH_3)=NCH_2]_2CH_2$ | 0.5 | 6 | 2,200 | 154 | 1,140 | 80 | 170 |
| 17 | $C_2H_5C(CH_3)=N-NHC_6H_5$ | 0.5 | 8 | 2,710 | 189 | 1,085 | 76 | 160 |
| 18 | Isophthalyl hydrazide | 0.5 | 8 | 2,290 | 160 | 780 | 55 | 190 |
| 19 | Dimethyl glyoxime | 0.2 | 12 | 2,375 | 166 | 940 | 66 | 170 |
| 20 | $OCNC_{36}H_{68}NCO$ | 1.0 | 9 | 2,400 | 168 | 1,450 | 100 | 140 |
| 21 | $C_{18}H_{37}NCO$ | 0.5 | 11 | 2,500 | 175 | 1,650 | 114 | 140 |

¹ No cure.
*After 24 hours at 205° C.
**Elongation at break.
***As piperidine salt.
****As a cyclohexylamine salt.

The following is a list of the amines liberated by the corresponding amine generators of Table E followed by molecular weight and amine equivalent weights.

TABLE F

| Run | Amine | Molecular weight | Amine equivalent weight |
|---|---|---|---|
| 1 | Cyclohexylamine | 99 | 99 |
| 2 | 2-OH-ethylamine | 61 | 61 |
| 3 | Cyclohexylamine | 99 | 99 |
| 4 | Aniline | 93 | 93 |
| 5 | o-$NO_2$-aniline | 138 | 138 |
| 6 | Cyclohexylamine | 99 | 99 |
| 7 | do | 99 | 99 |
| 8 | do | 99 | 99 |
| 9 | Piperidine | 85 | 85 |
| 10 | Cyclohexylamine | 99 | 99 |
| 11 | Methylamine | 31 | 31 |
| 12 | 2-OH-ethylamine | 61 | 61 |
| 13 | 2-methoxyethylamine | 75 | 75 |
| 14 | Trimethylene diamine | 74 | 37 |
| 15 | do | 74 | 37 |
| 16 | do | 74 | 37 |
| 17 | $C_6H_5NHNH_2$ | 108 | 54 |
| 18 | Hydrazine | 32 | 16 |
| 19 | Hydroxylamine | 33 | 33 |
| 20 | $H_2NC_{30}H_{18}NH_2$ | 532 | 266 |
| 21 | $C_{18}H_{37}NH_2$ | 269 | 269 |

EXAMPLE IX

The data in Table G shows the use of hydroquinone and various quaternary compounds in a curable formulation containing no amine compounds. Low compression set values were obtained as reported. The amounts of the components in the formulation are given in parts by weight, and the quaternary components were used in about 25 percent solution in methanol.

EXAMPLE X

The need for both a quaternary compound and an oxidizable aromatic hydroxy or amino compound is illustrated by the comparative data in Table H. All amounts are in parts by weight, and the quaternary compound was used in a 25 percent methanol solution. It is significant that quaternary compounds at the relatively low concentrations of this invention do not effect a cure when no oxidizable aromatic hydroxy or amino compound is present. The use of large amounts of curing agent (e.g. quaternary compound) to obtain reasonable cure rates, as is shown in U.S. 3,403,127, is undesirable because of high compression set and poor aging properties. Quantities are in parts by weight.

EXAMPLE XI

The data in Table I illustrate the poor results obtained when no oxidizable aromatic hydroxy or amino compound is included in the formulation. No cure was obtained when only 1 part of the quaternary compound was used, and the cure obtained at the higher concentration of quaternary compound resulted in a product with 44 percent compression set. Runs 1 and 2 of Table I correspond to Examples 1(b) and 1(c) in U.S. 3,403,127.

EXAMPLE XII

The data in Table J exemplify the use of several quaternary phosphonium compounds. All concentrations are in parts by weight, and the phosphonium compounds were in 25 percent methanol solution. Each run was milled on a rubber mill, molded for 30 minutes at 335° F. and post cured at 500° F. for 20 hours.

EXAMPLE XIII

Runs illustrating the use of various amine compounds, including aromatic amines and tertiary amines, in the curable formulation along with the quaternary compound and oxidizable aromatic amino or hydroxy compound, are presented in Table K. The quaternary compound was in a 25 percent methanol solution. All concentrations are in parts by weight.

TABLE G

| | 1 | 2 | 3 | 4 | 5 |
|---|---|---|---|---|---|
| Fluoroelastomer ($C_3F_6$/$CF_2$=$CH_2$, 24/76 mol ratio) | 100 | 100 | 100 | 100 | 100 |
| [($C_4H_9$)$_4$N$^+$][O$CH_3^-$] | 0.4 | | | | |
| [($C_4H_9$)$_4$N$^+$][O$C_6H_5^-$] | | 0.5 | | | |
| [($C_4H_9$)$_4$N$^+$][OH$^-$] | | | 0.4 | | |
| [($C_4H_9$)$_4$N$^+$] [thiadiazole structure] | | | | 0.5 | |
| [($C_4H_9$)$_4$N$^+$][Br$^-$] | | | | | 0.5 |
| Carbon black | 30 | 30 | 30 | 30 | 30 |
| Magnesium oxide | 10 | 10 | 10 | 10 | 10 |
| Ca(OH)$_2$ | 2 | 2 | 2 | 2 | 2 |
| Hydroquinone | 1 | 1 | 1 | 1 | 1 |
| Cure: | | | | | |
| Sheet, 168° C. (30 minutes) | | | | | |
| Plug, 160° C. (30 minutes) | | | | | |
| Post cure: 260° C. (20 hours) | | | | | |
| Compression set (percent): 400° F. (205° C.), 22 hours | 7 | 7.4 | 11 | 6.⅜ | 6.⅜ |
| Mooney: | | | | | |
| (10 pt. rise at 121° C.), minutes | 25+ | 25+ | 1.4 | 25+ | 25+ |
| (point rise in 25 minutes at 121° C.) | 4 | 0 | | 4 | 2 |
| Mooney, 335° F. (168° C.): | | | | | |
| 15 minute | 3.9 | 5.4 | 0.3 | 3.0 | 4.7 |
| 30 minute | 4.5 | 6.1 | 0.4 | 3.3 | 5.4 |
| Original: | | | | | |
| Tensile at break (p.s.i.) | 2,025 | 2,105 | 1,480 | 2,000 | 2,130 |
| Modulus at 100% elongation (p.s.i.) | 1,430 | 1,325 | 1,300 | 1,445 | 1,000 |
| Elongation at break (percent) | 135 | 145 | 150 | 140 | 175 |
| Hardness, Shore A$_2$ | 71 | 72 | 72 | 73 | 72 |
| Heat aged (275° C., 72 hours): | | | | | |
| Tensile at break (p.s.i) | 1,410 | 1,445 | 1,400 | 1,620 | 1,490 |
| Modulus at 100% elongation (p.s.i.) | 1,345 | | | 1,620 | 1,380 |
| Elongation at break (percent) | 115 | 90 | 90 | 100 | 120 |
| Hardness, Shore A$_2$ | 83 | 81 | 84 | 80 | 79 |

TABLE H

|  | 1 | 2 | 3 |
|---|---|---|---|
| Elastomer ($C_3F_6$/$CF_2$=$CH_2$, 24/76 mol ratio) | 100 | 100 | 100 |
| Tetrabutylammonium bromide | 0.5 | 0.5 | --- |
| Hydroquinone | 1.0 | --- | 1.0 |
| Carbon black | 30 | 30 | 30 |
| Magnesium oxide | 10 | 10 | 10 |
| Calcium hydroxide | 2 | 2 | 2 |
| Cure: | | | |
| Sheets, 168° C. (30 minutes) | | | |
| Plugs, 160° C. (30 minutes) | | | |
| Post cure: 260° C. (20 hours) | | | |
| Compression set, percent: 205° C., 22 hours | 6 | (1) | (1) |
| Mooney: | | | |
| 10 pt. rise at 121° C., minutes | 25+ | (1) | (1) |
| Point rise in 25 minutes at 121° C | 1 | (1) | (1) |
| Mooney, 335° F. (168° C.): | | | |
| 15 minute | 4.4 | (1) | (1) |
| 30 minute | 5.1 | (1) | (1) |
| Original: | | | |
| Tensile at break (p.s.i.) | 2,000 | (1) | (1) |
| Modulus at 100% elongation (p.s.i.) | 1,245 | (1) | (1) |
| Elongation at break (percent) | 140 | (1) | (1) |
| Hardness, Shore $A_2$ | 71 | (1) | (1) |
| Heat aged (275° C., 72 hours): | | | |
| Tensile at break (p.s.i.) | 1,385 | (1) | (1) |
| Elongation at break (percent) | 95 | (1) | (1) |
| Hardness, Shore $A_2$ | 81 | (1) | (1) |

[1] No cure.

TABLE I

|  | 1 | 2 |
|---|---|---|
| Vinylidene fluoride/hexafluoropropene copolymer ("Vitron A") | 100 | 100 |
| Carbon black | 20 | 20 |
| Magnesium oxide | 15 | 15 |
| Calcium oxide | 1 | 2 |
| 1,4-phenylene dimethylene bis(triethylammonium) chloride | 1 | 2 |
| Cure: | | |
| Sheets, 168° C., 45 minutes | | |
| Plugs, 160° C., 45 minutes | | |
| Oven cure: 100° C. (1 hr.), 120° C. (1 hr.), 140° C. (1 hr.), 160° C. (1 hr.), 180° C. (1 hr.), 200° C. (19 hrs.) | | |
| Mooney, 335° F. (168° C.): | | |
| 15 minutes | 13.7 | 6.5 |
| 30 minutes | 22+ | 9.8 |
| Compression set, percent: 205° C., 24 hrs | (1) | 44% |
| Original | | |
| Tensile at break (p.s.i.) | (1) | 1,725 |
| Modulus at 100% elongation (p.s.i.) | (1) | 745 |
| Elongation at break (percent) | (1) | 200 |
| Hardness, Shore $A_2$ | (1) | 69 |
| Heat aged (275° C., 72 hours): | | |
| Tensile at break (p.s.i.) | (1) | 1,300 |
| Elongation at break (percent) | (1) | 45 |
| Hardness, Shore $A_2$ | (1) | 88 |

[1] No cure in sheet or plug.

TABLE J

[Cure and post cure as in Table G]

|  | 1 | 2 |
|---|---|---|
| Fluoroelastomer ($C_3F_6$/$CF_2$=$CH_2$; 24/76 mol ratio) | 100 | 100 |
| [$(C_4H_9)_4P^+$][$Br^-$] | 0.53 | --- |
| [$(C_4H_9)_4P^+$] 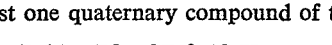 | --- | 0.58 |
| Carbon black | 30 | 30 |
| Magnesium oxide | 10 | 10 |
| Hydroquinone | 1 | 1 |
| Calcium hydroxide | 2 | 2 |
| Compression set (percent) at 400° F. (24 hrs.) | 6.5 | 4.2 |
| Original: | | |
| Tensile at break (p.s.i.) | 2,004 | 2,140 |
| Modulus at 100% elongation (p.s.i.) | 1,170 | 800 |
| Elongation at break (percent) | 160 | 190 |
| Hardness, Shore $A_2$ | 73 | 70 |
| Heat aged (528° F., 72 hrs.): | | |
| Tensile at break (p.s.i.) | 1,360 | 1,355 |
| Modulus at 100% elongation (p.s.i.) | 1,180 | 765 |
| Elongation at break (percent) | 135 | 190 |
| Hardness, Shore $A_2$ | 79 | 73 |
| Mooney: 10 pt. rise at 121° C., minutes | 25+ | 25+ |
| Mooney, 335° F.: | | |
| 15 minutes | 4.6 | 7.7 |
| 30 minutes | 5.2 | 8.75 |

TABLE K

|  | 1 | 2 | 3 | 4 | 5 | 6 |
|---|---|---|---|---|---|---|
| Amine | 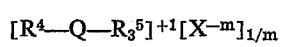 | H₂N—⌬—⌬—NH₂ | H₂N—⌬—O—⌬—NH₂ | Z—⌬—OH (Z=CH₂N(CH₃)₂) | piperazine derivative | N(C₂H₅)₃ |
| $C_3F_6$/$CF_2$=$CH_2$ elastomer (24/76 mol ratio) | 100 | 100 | 100 | 100 | 100 | 100 |
| Weight of amine | 0.5 | 0.5 | 0.5 | 0.5 | 0.5 | 0.5 |
| Tetrabutylammonium hydroxide | 0.2 | 0.2 | 0.2 | 0.2 | 0.2 | 0.2 |
| Carbon black | 30 | 30 | 30 | 30 | 30 | 30 |
| Magnesium oxide | 10 | 10 | 10 | 10 | 10 | 10 |
| Hydroquinone | 1 | 1 | 1 | 1 | 1 | 1 |
| Calcium hydroxide | 2 | 2 | 2 | 2 | 2 | 2 |
| Compression set (percent) (400° F., 24 hrs.) | 9 | 8.5 | 7 | 8.5 | 14 | 8 |
| Original: | | | | | | |
| Tensile at break (p.s.i.) | 2,535 | 2,345 | 2,330 | 2,640 | 2,010 | 2,560 |
| Modulus at 100% elongation (p.s.i.) | 2,270 | 1,600 | 1,620 | 575 | --- | 700 |
| Elongation at break (percent) | 120 | 135 | 140 | 230 | 60 | 210 |
| Hardness, Shore $A_2$ | 77 | 69 | 70 | 65 | 80 | 65 |
| Heat aged (72 hrs. at 528° F.) | | | | | | |
| Tensile at break (p.s.i.) | 2,030 | 1,710 | 1,700 | 1,770 | 1,355 | 1,700 |
| Modulus at 100% elongation (p.s.i.) | 1,930 | 1,260 | 1,430 | 710 | --- | 705 |
| Elongation at break (percent) | 110 | 140 | 130 | 190 | 20 | 258 |
| Hardness, Shore $A_2$ | 80 | 72 | 76 | 68 | 94 | 60 |

What is claimed is:

1. An admixture curable in reactive association with an inorganic acid acceptor capable of generating water upon reacting with hydrogen fluoride to produce a cured elastomer having low compression set comprising the following components:

(a) An elastomeric copolymer of vinylidene fluoride and at least one terminally unsaturated fluoromonoolefin containing at least one fluorine atom substituent on each double bonded carbon atom, each carbon atom of said fluoromonoolefin being substituted only with fluorine, chlorine, hydrogen or a lower fluoroalkyl or fluoroalkoxy radical, at least 10 percent of the chain carbon atoms of said copolymer being —$CH_2$— units;

(b) At least one quaternary compound of the formula $$[R_3^1Q{-}R^2{-}QR_3^3]^{+2}[X^{-m}]_{2/m}$$

or $$[R^4{-}Q{-}R_3^5]^{+1}[X^{-m}]_{1/m}$$

wherein Q is a nitrogen atom, $R^2$ is an alkylene radical having from 2 to 12 carbon atoms or a phenylene dialkylene radical having from 8 to 12 carbon atoms, $R^4$ is an alkyl radical having from 1 to 12 carbon atoms or an aralkyl radical having from 7 to 12 carbon atoms, wherein $R^1$, $R^3$ and $R^5$ are alkyl radicals having from 1 to 18 carbon atoms, X is an anion, and $m$ is the valence of anion X; and (c) At least one aromatic hydroxy or amino compound which has an oxidation potential no more than 1.5 volts with respect to a standard calomel electrode, said curable admixture containing, per 100 parts by weight of said elastomeric copolymer, a concentration of said component (b) from about 0.05 to about 0.5 part by weight and a concentration of said component (c) from about 0.1 to about 2 parts by weight.

2. The curable admixture of claim 1 in which said mixture also includes from 0.1 to 2.5 parts by weight of (d) an aromatic amine, an aliphatic tertiary amine or a compound which is stable in the absence of water at temperatures below about 75° C. and which at temperatures above about 125° C. in the presence of water generates a basic nitrogen atom-containing compound having a $pK_b$ in water of no more than 14 and having at least one hydrogen atom bonded to said basic nitrogen atom.

3. The curable admixture of claim 1 in which said admixture also contains from about 2 to about 25 parts by weight, based on 100 parts by weight of elastomeric copolymer, of an inorganic acid acceptor capable of generating water upon reacting with hydrogen fluoride.

4. The curable admixture of claim 1 in which said elastomeric copolymer is an elastomeric copolymer of vinylidene fluoride and at least one comonomer selected from the group consisting of chlorotrifluoroethylene, perfluoropropene, 1-hydroperfluoropropene and tetrafluoroethylene.

5. The curable admixture of claim 1 in which said elastomeric copolymer is an elastomeric copolymer of vinylidene fluoride and perfluoropropene.

6. The curable admixture of claim 1 in which said elastomeric copolymer is an elastomeric copolymer of vinylidene fluoride, perfluoropropene and tetrafluoroethylene.

7. An admixture curable in reactive association with an oxidizable aromatic hydroxy or amino compound and an inorganic acid acceptor capable of generating water upon reacting with hydrogen fluoride to produce a cured elastomer having low compression set comprising the following components:

(a) An elastomeric coplymer of vinylidene fluoride and at least one terminally unsaturated fluoromonoolefin containing at least one fluorine atom substituent on each double bonded carbon atom, each carbon atom of said fluoromonoolefin being substituted only with fluorine, chlorine, hydrogen or a lower fluoroalkyl or fluoroalkoxy radical, at least 10 percent of the chain carbon atoms of said copolymer being —$CH_2$— units;

(b) At least one quaternary compound of the formula

or

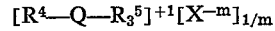

wherein Q is a nitrogen atom, $R^2$ is an alkylene radical having from 2 to 12 carbon atoms or a phenylene dialkylene radical having from 8 to 12 carbon atoms, $R^4$ is an alkyl radical having from 1 to 12 carbon atoms or an aralkyl radical having from 7 to 12 carbon atoms, wherein $R^1$, $R^3$ and $R^5$ are alkyl radicals having from 1 to 18 carbon atoms, X is an anion, and $m$ is the valence of anion X; and (c) At least one aromatic amine, aliphatic tertiary amine or a compound which is stable in the absence of water at temperatures below about 75° C. and which at temperatures above about 125° C. in the presence of water generates a basic nitrogen atom-containing compound having a $pK_b$ in water of no more than 14 and having at least one hydrogen atom bonded to said basic nitrogen atom, said curable admixture containing, per 100 parts by weight of said elastomeric copolymer, a concentration of said component (b) from about 0.05 to about 0.5 part by weight and a concentration of said component (c) from about 0.1 to about 2.5 parts by weight.

8. The curable admixture of claim 7 in which said admixture also contains (d) from about 2 to about 25 parts by weight, based on 100 parts by weight of said elastomeric copolymer, of an inorganic acid acceptor capable of generating water upon reacting with hydrogen fluoride.

9. The curable admixture of claim 8 in which said component (a) is magnesium oxide, lead oxide or dibasic lead phosphite.

10. The curable admixture of claim 7 in which said admixture also contains from about 0.5 to about 10 parts by weight of an inorganic base, based on 100 parts by weight of said elastomeric copolymer.

11. The curable admixture of claim 7 in which said elastomeric copolymer is an elastomeric copolymer of vinylidene fluoride and perfluoropropene.

12. The curable admixture of claim 7 in which said elastomeric copolymer is an elastomeric copolymer of vinylidene fluoride, perfluoropropene and tetrafluoroethylene.

13. The curable admixture of claim 7 in which the amine or basic nitrogen-containing compound of component (c) has a molecular weight of not more than 1000 and an amine equivalent weight of not more than 500.

14. A process for curing an elastomeric copolymer of vinylidene fluoride and at least one terminally unsaturated fluoromonoolefin containing at least one fluorine substituent on each double bonded carbon atom, each carbon atom of said fluoromonoolefin being substituted only with fluorine, chlorine, hydrogen or a lower fluoroalkyl or fluoroalkoxy radical, at least 10 percent of the chain carbon atoms of said copolymer being —$CH_2$— units, which comprises:

(a) Admixing therewith from about 0.1 to about 2 pphr. of an oxizoable aromatic hydroxy or amino compound which has an oxidation potential no more than 1.5 volts with respect to a standard calomel electrode, from about 2 to about 25 pphr. of an inorganic acid acceptor capable of generating water upon reacting with hydrogen fluoride, and from about 0.05 to about 0.5 pphr. of at least one quaternary compound of the formula

or

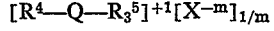

wherein Q is a nitrogen atom, $R^2$ is an alkylene radical having from 2 to 12 carbon atoms or a phenylene dialkylene radical having from 8 to 12 carbon atoms, $R^4$ is an alkyl radical having from 1 to 12 carbon atoms or an aralkyl radical having from 7 to 12 carbon atoms, wherein $R^1$, $R^3$ and $R^5$ are alkyl radicals having from 1 to 18 carbon atoms, X is an anion and $m$ is the valence of X;

(b) Subjecting said admixture to a pressure of between about 7 and 210 kg./cm.² at a temperature of between about 95° C. and 230° C. for a period of between about 1 minute and about 15 hours, and (c) releasing the pressure from said admixture and heating the resulting product at a temperature between about 150° C. and about 315° C. for a period of between about 2 and 50 hours.

15. The process of claim 14 in which said oxidizable aromatic hydroxy or amino compound is hydroquinone.

16. The process of claim 14 in which said elastomeric copolymer is an elastomeric copolymer of vinylidene fluoride and at least one comonomer selected from the group consisting of chlorotrifluoroethylene, perfluoropropene, 1-hydroperfluoropropene and tetrafluoroethylene.

17. The process of claim 14 in which said elastomeric copolymer is an elastomeric copolymer of vinylidene fluoride and perfluoropropene.

18. The process of claim 14 in which said elastomeric copolymer is an elastomeric copolymer of vinylidene fluoride, perfluoropropene and tetrafluoroethylene.

19. The process of claim 14 in which to said admixture is also added up to 2.5 pphr. of at least one aromatic amine, aliphatic tertiary amine or a compound which is stable in the absence of water at temperatures below about 75° C. and which at temperatures above about 125° C. in the presence of water generates a basic nitrogen atom-containing compound having a $pK_b$ in water of no more than 14 and having at least one hydrogen atom bonded to said basic nitrogen atom.

References Cited
UNITED STATES PATENTS

| | | | |
|---|---|---|---|
| 2,752,331 | 6/1956 | Dittman et al. | 260—87.7 |
| 2,951,832 | 9/1960 | Moran | 260—875 |
| 2,968,649 | 1/1961 | Pailthorp et al. | 260—80.5 |
| 3,051,677 | 8/1962 | Rexford | 260—29.6 |
| 3,080,336 | 3/1963 | Smith | 260—41 |
| 3,088,938 | 5/1963 | Cluff | 260—87.7 |
| 3,243,411 | 3/1966 | Tawney et al. | 260—61 |
| 3,318,854 | 5/1967 | Honn et al. | 260—87.7 |
| 3,403,127 | 9/1968 | Flavell et al. | 260—41 |

OTHER REFERENCES

The O. G. Defensive Publication Keller, Def. Pub. of Ser. No. 608,999 filed Jan. 13, 1967, published in 856 O. G. 4, on Nov. 5, 1968, Defensive Publication No. T 856,007, class 260—87.7.

JOSEPH L. SCHOFER, Primary Examiner

S. M. LEVIN, Assistant Examiner

U.S. Cl. X.R.

260—31.2 R, 32.8 R, 41 B, 41 C, 80.76, 80.77, 87.7

UNITED STATES PATENT OFFICE
CERTIFICATE OF CORRECTION

Patent No. 3,655,727   Dated April 11, 1972

Inventor(s) Kalyanji U. Patel and John E. Maier   Page 1 of 2

It is certified that error appears in the above-identified patent and that said Letters Patent are hereby corrected as shown below:

Column 1, line 18, "aromatic" should be --elastomeric--

Column 1, line 21, "elastomeric" should be --aromatic--

Column 1, line 70, "and the polymers" should be --the polymers--

Column 5, line 5, "[$(C_4H_9)_4P+$]BR-" should be --[$(C_4H_9)_4P+$]Br- --

Column 6, line 62, "$6CH_2O + 4NH_2$" should be --$6CH_2O + 4NH_3$--

Column 9, line 50, "or" should be --on--

Column 10, line 35, --of-- should be inserted after "any"

Column 11, line 2, "was" should be --are--

Column 12, line 1, "cure" should be --cured--

Column 12, Table A, in item Compression set: under Run V, 1 day at 400° F.(205° C.), "3" should be --6--

Column 13, Table in middle of column, 8th item in Table, "Tensile strength at break, p.s.i.(kg./cm)A" should be --Tensile strength at break, p.s.i.(kg./cm$^2$)A--

Column 14, Table C, line 7, "$(C_6H_{13}CH=NCH_2)_2$—CH" should be --$(C_6H_{13}CH=NCH_2)_2$—$CH_2$--

UNITED STATES PATENT OFFICE
CERTIFICATE OF CORRECTION

Patent No. 3,655,727　　　　　　Dated April 11, 1972

Inventor(s) Kalyanji U. Patel and John E. Maier　　Page 2 of 2

It is certified that error appears in the above-identified patent and that said Letters Patent are hereby corrected as shown below:

Column 18, Table G, in item Compression set(percent):400°F.(205°C.),22 hours,
under 4, "6.3/8" should be --6.3--
under 5, "6.3/8" should be --8--

Column 19, line 57, in Table I, first item,
"("Vitron A")" should be --("Viton A")--

Column 20, Table K, in item "Heat aged(72 hrs. at 528° F.)",
under 6, Elongation at break(percent), "258" should be --250--
Hardness, Shore A$_2$, "60" should be --68--

Column 22, line 14, in claim 9, "(a)" should be --(d)--

Column 22, line 41, in claim 14, "oxizoable" should be --oxidizable--

Signed and Sealed this twentieth Day of April 1976

[SEAL]

Attest:

RUTH C. MASON　　　　　　　　C. MARSHALL DANN
Attesting Officer　　　　　　Commissioner of Patents and Trademarks